Patented Mar. 19, 1940

2,194,439

UNITED STATES PATENT OFFICE 2,194,439

COATING COMPOSITION, THE METHOD OF PREPARING THE SAME, AND ITS APPLICATION

Martin B. Chittick, Wilmette, Ill., assignor to The Pure Oil Company, Chicago, Ill., a corporation of Ohio No Drawing. Application June 7, 1934, Serial No. 729,476

5 Claims. (Cl. 44—6)

This invention relates to protective and/or decorative coatings, to the method of preparing the same, and to their application. More specifically, the invention relates to a composition having as a base unsaturated hydrocarbon polymers produced in refining of hydrocarbon oils prepared in the form of an emulsion.

Mineral oils which are cracked in the vapor phase at elevated temperatures of approximately 1100° F. in order to produce gasoline of high anti-knock characteristics contain a large proportion of unsaturated bodies of the nature of diolefins which tend to form gums. In order to remove these gum-forming constituents from light distillates, the distillates are either revaporized and treated with an adsorptive catalyst such as fuller's earth in the vapor state, or the cracked vapors may be fractionated as they come from the cracking zone and the fractionated vapors contacted with adsorptive catalyst. In some instances hydrocarbon liquids containing diolefin or other gum-forming constituents may be contacted with adsorptive catalyst in the liquid or vapor phase, or in mixed liquid and vapor phase, under elevated pressures of the order of 500 to 2000 pounds per square inch and under temperatures of 300 to 600° F. or more, with adsorptive catalyst in order to remove the gum-forming constituents.

As a result of refining processes of the nature of those above mentioned, unsaturated hydrocarbon polymers are produced which have been found to have exceptional drying properties when exposed to air. Because of the light color of such polymers, they can be easily pigmented, and by using a suitable varnish or paint adjuvant, they make excellent coating compositions for protective or decorative purposes. Polymers which are useful in connection with my invention may have the following characteristics:

| | |
|---|---|
| Gravity (A. P. I.) | 35.9 |
| Flash point | Room temp. |
| Fire point | 95° F. |
| Saybolt viscosity (at 70° F.) | 33.6 |
| Saybolt viscosity (at 100° F.) | 32.4 |
| Pour Point (A. S. T. M.) | Below —45° F. |
| Carbon residue (A. S. T. M.) | 1.27% |
| Iodine No. (Wijs) | 162.7 |
| Iodine No. (reduced to 50% non-volatile) | 177 |
| Non-volatile content (A. S. T. M.-D154–28) | 14.2% |
| Drying time | 3½ hrs. |
| Drying time reduced to 50% non-volatile | 2¾ hrs. |

The drying time of raw linseed oil is 112 hrs.

I have further discovered that polymers of the above described nature may be readily emulsified to produce coating compositions having a wide variety of uses. In preparing such emulsions I may prepare a mixture of 88% polymers and 12% of a sulfonated fatty oil which acts as an emulsifying agent, and emulsify 25 parts of this mixture with 75 parts of water. A stable emulsion is formed of such consistency that it can be sprayed or brushed. The consistency of the emulsion will be determined mainly by the amount of water and the type and amount of emulsifying agent used. For example, sodium stearate when used as an emulsifying agent if present in sufficient amounts will give an emulsion having a pasty consistency. Other well known emulsifying agents such as soaps, colloidal clay and triethanolamine may be used. The emulsion may be pigmented with suitable coloring agents and may have drying, semi-drying, or non-drying oils, such as tung oil, linseed oil, fish oils, and mineral oils, added thereto. In order to prepare an emulsion which will dry to an elastic coating or film, fish oil or mineral oil or other semi- or non-drying oil should be added. As an example of such an emulsion, a mixture of 68% polymers, 20% heat treated fish oil and 12% of sulfonated fatty oil is prepared, and 25 parts of this mixture is emulsified with 75 parts of water.

The polymers may either be used in the state in which they are removed from the refining tower or they may be reduced with fire and steam to remove part or all of the volatile matter. The emulsion in accordance with my invention may be prepared at room temperature or at elevated temperature. If the polymers are liquid at ordinary temperature it is not necessary to heat in order to emulsify. However, if reduced polymers of heavy consistency are used, it will be necessary to heat the polymers to sufficiently reduce their viscosity in order to make them readily emulsifiable.

Polymers of the nature herein set forth are particularly useful for coating coal and other solid bituminous materials which have a tendency to dust. In using polymers for this purpose it is preferable to reduce them by fire and steam until they have the following characteristics:

| | |
|---|---|
| Gravity (A. P. I.) | 11.6 |
| Flash | 360° F. |
| Fire | 400° F. |
| Saybolt viscosity at 180° F. | 208 |
| Saybolt viscosity at 210° F. | 608 |
| Volatile (A. S. T. M.) | 15.98% |
| Non-volatile (A. S. T. M.) | 84.02% |

It will be noted that the flash and fire points of these reduced polymers are sufficiently high so that there is no danger of inflammability. Such polymers when applied to the coal will dry in a few hours to form a solid coating and are more desirable for that reason than mineral oils which have heretofore been used for this purpose. The coating is elastic so that it will not crack off when dry, and burns readily and completely at elevated temperatures without an undesirable odor. Polymers when used for this purpose may be employed in the form of an emulsion as previously set forth or they may be applied in solution in a suitable solvent such as mineral oil or other cheap organic solvent. The polymers may have mineral oils mixed with them in various proportions when prepared in the form of emulsions. Such oils give elasticity to the dry film.

When compositions prepared in accordance with my invention are spread in a thin film, they dry in a few hours to a light transparent film. Because of the naturally light color of the polymers, they are highly suitable for decorative purposes since they can be pigmented with organic or inorganic coloring matter ordinarily used in paint and varnish manufacturing to give any desired tint.

What is claimed is:

1. A method of preventing dusting of solid commercial lump fuel having a tendency to form dust which comprises coating said fuel with hydrocarbon polymers obtained from the refining of highly unsaturated hydrocarbon distillates produced by vapor phase cracking, said polymers being applied in the form of an emulsion.

2. As a new article of manufacture, a lump of coal coated with a solid film of oxidized polymers resulting from the refining of vapor phase cracked vapors with an adsorptive catalyst.

3. As a new article of manufacture, a commercial lump fuel coated with a solid film of oxidized polymers resulting from the refining of vapor phase cracked vapors with an adsorptive catalyst, said coating being inflammable only at elevated temperatures.

4. A method in accordance with claim 1 in which the emulsion is an aqueous emulsion and the emulsifying agent is a water soluble soap.

5. A method in accordance with claim 1 in which the emulsion is an aqueous emulsion and the emulsifying agent is sodium stearate.

MARTIN B. CHITTICK.